(12) United States Patent
Barink et al.

(10) Patent No.: US 7,366,465 B2
(45) Date of Patent: Apr. 29, 2008

(54) HOMODYNE RFID RECEIVER AND METHOD

(75) Inventors: Bernard Barink, McKinney, TX (US); Loek J. d'Hont, Rotonda-West, FL (US)

(73) Assignee: Sirit Technologies Inc., Toronto, Ontario (CA)

( * ) Notice: Subject to any disclaimer, the term of this patent is extended or adjusted under 35 U.S.C. 154(b) by 560 days.

(21) Appl. No.: 10/992,958

(22) Filed: Nov. 19, 2004

(65) Prior Publication Data

US 2006/0111051 A1    May 25, 2006

(51) Int. Cl.
*H04B 7/00* (2006.01)
*G08B 13/14* (2006.01)

(52) U.S. Cl. .................. 455/41.1; 455/41.2; 340/572.1

(58) Field of Classification Search ............. 455/41.1, 455/41.2, 422.1, 423, 70, 67.11; 342/42, 342/44; 340/10.4, 572.1, 572.2, 10.1, 10.3
See application file for complete search history.

(56) References Cited

U.S. PATENT DOCUMENTS

| | | | |
|---|---|---|---|
| 4,360,810 A | 11/1982 | Landt | |
| 4,739,328 A | 4/1988 | Koelle et al. | |
| 4,786,907 A | 11/1988 | Koelle | |
| 4,888,591 A | 12/1989 | Landt et al. | |
| 4,942,591 A * | 7/1990 | Nease et al. | 375/330 |
| 5,030,807 A | 7/1991 | Landt et al. | |
| 5,055,659 A | 10/1991 | Hendrick et al. | |
| 5,485,520 A | 1/1996 | Chaum et al. | |
| 5,640,687 A * | 6/1997 | Meron et al. | 455/83 |
| 5,784,686 A | 7/1998 | You-Sun et al. | |
| 5,828,693 A | 10/1998 | Mays et al. | |
| 6,075,980 A | 6/2000 | Scheck | |

(Continued)

FOREIGN PATENT DOCUMENTS

WO    01/28085 A1    4/2001

OTHER PUBLICATIONS

Notification of Transmittal of the International Preliminary Report on Patentability and Internatiional Preliminary Report on Patentability issued in corresponding International Applicatiion No. PCT/US2005/040849; Apr. 4, 2007, 6 pages.

(Continued)

*Primary Examiner*—Sonny Trinh
(74) *Attorney, Agent, or Firm*—Fish & Richardson P.C.

(57) ABSTRACT

An RFID circuit comprises an RF carrier signal source, and a hybrid coupled thereto operable to generate first, second and third phase-shifted RF carrier signals. The circuit further comprises first, second, and third mixers coupled to the hybrid each operable to multiply one of the first, second and third respective carrier signals and a backscattered modulated carrier signal and generate first, second and third baseband signals, respectively. The circuit further comprises first, second, and third delay lines respectively coupled to the first, second, and third mixers and operable to generate first, second and third delayed baseband signals. The circuit further comprises logic coupled to the first, second, and third mixers and the first, second, and third delay lines and operable to detect substantially simultaneous data transitions in at least two of the first, second, and third baseband signals, and generating a reconstructed signal having a data transition in response thereto.

28 Claims, 3 Drawing Sheets

U.S. PATENT DOCUMENTS

| | | |
|---|---|---|
| 6,456,668 B1 * | 9/2002 | MacLellan et al. ......... 375/283 |
| 6,611,224 B1 | 8/2003 | Nysen et al. |
| 6,639,509 B1 | 10/2003 | Martinez |
| 6,686,830 B1 | 2/2004 | Schirtzer |
| 7,023,341 B2 * | 4/2006 | Stilp ........................ 340/572.1 |
| 7,091,827 B2 * | 8/2006 | Stilp .......................... 340/10.1 |
| 2002/0149484 A1 | 10/2002 | Carrender |
| 2007/0075834 A1 * | 4/2007 | Armstrong et al. ........ 340/10.1 |

OTHER PUBLICATIONS

International Search Report and Written Opinion of the international Searching Authority mailed Nov. 27, 2006 for PCT Application No. PCT/US2005/040849, 11 pages.

* cited by examiner

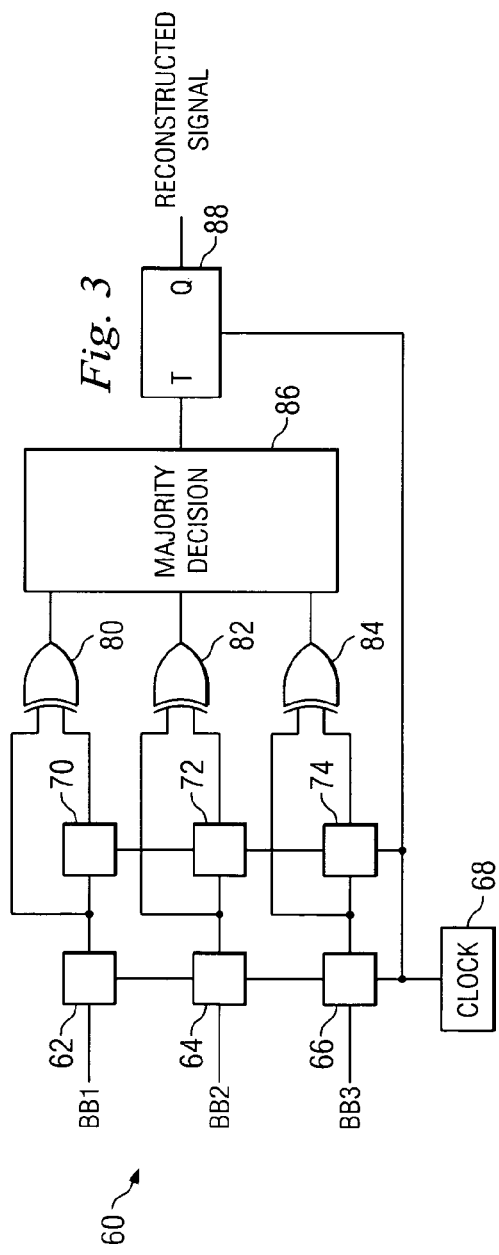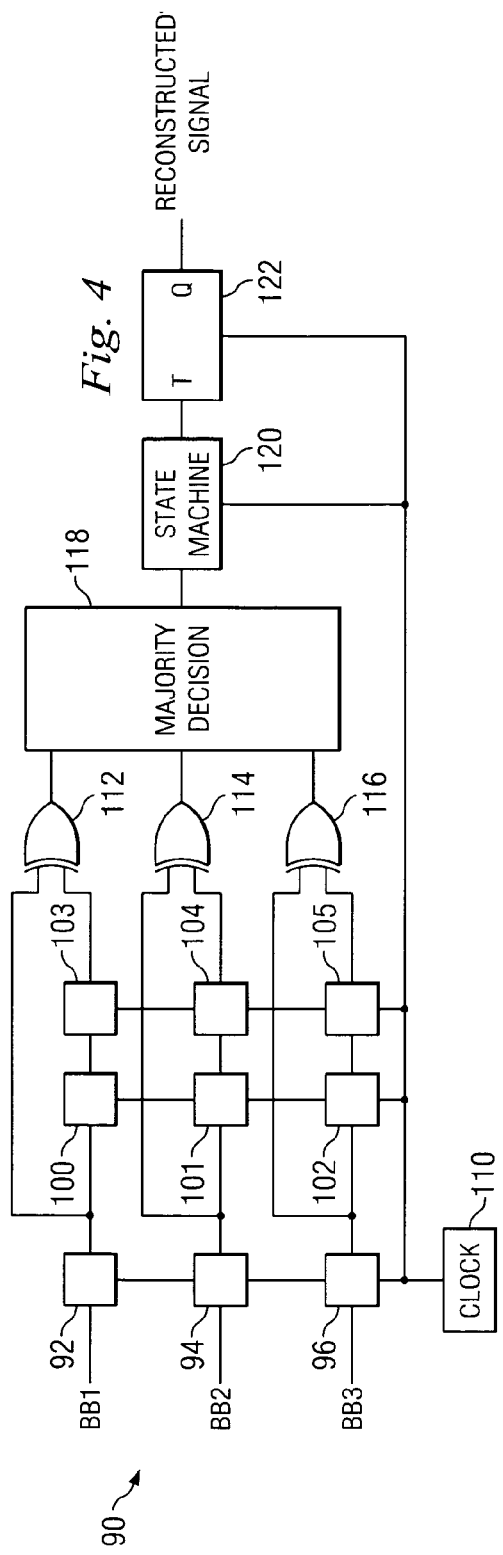

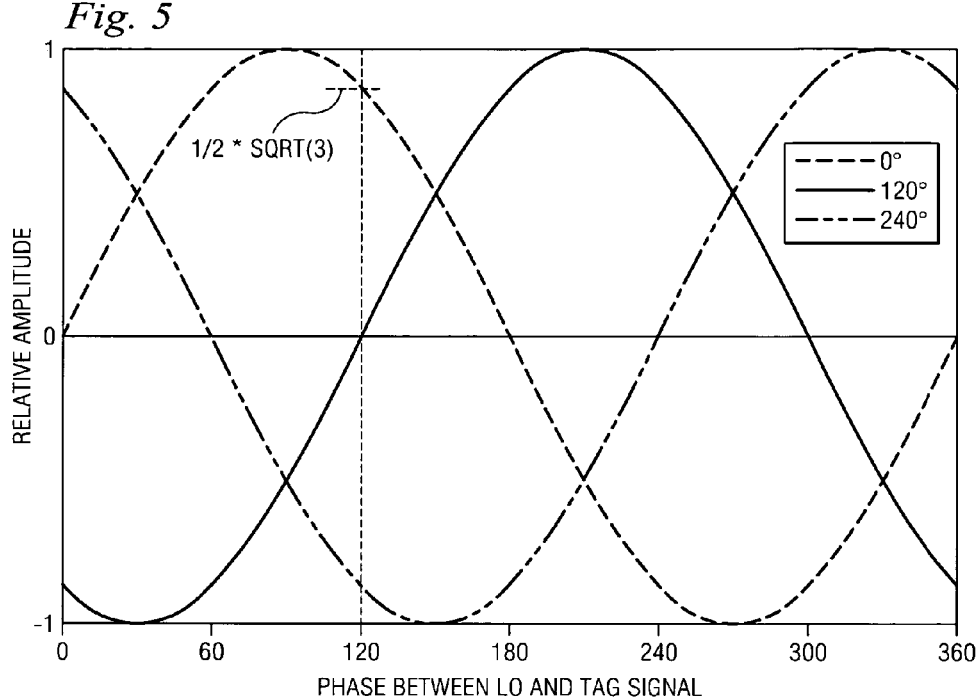
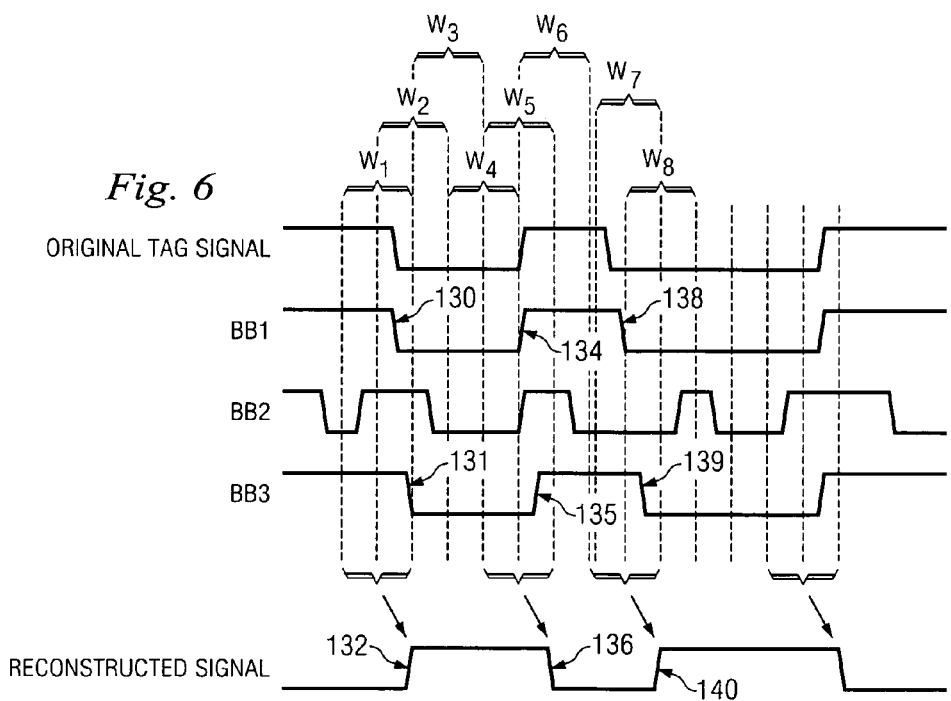

HOMODYNE RFID RECEIVER AND METHOD

BACKGROUND

RFID or radio frequency identification technology has been used in a variety of commercial applications such as inventory tracking and highway toll tags. In general, a transceiver tag or transponder transmits stored data by backscattering varying amounts of an electromagnetic field generated by an RFID reader. The RFID tag may be a passive device that derives its electrical energy from the received electromagnetic field or may be an active device that incorporates its own power source. The backscattered energy is then read by the RFID reader and the data is extracted therefrom.

Several technical hurdles must be overcome in order to make RFID work. Typically, the backscattered energy from the RFID tag contains relatively low power and has a short range. There is also a tendency for the transmitted signal to leak into the received signal path in the reader, thus introducing noise. Neither the distance between the RFID tag and reader nor the phase relationship between the backscattered signal and the local oscillator in the reader is known. The RFID system must also function where the RFID tag has a non-zero rate of displacement and/or acceleration toward or away from the RFID reader. In toll road applications, for example, it is desirable to permit a RFID tag a speed of at least 100 mph.

Because the RFID reader's local oscillator frequency is identical to that of the carrier frequency, the receiver is a homodyne detector. In a homodyne receiver, two detected channels are required to detect the backscattered signal's amplitude modulation envelope because signals nulls may be present depending on the signal phase relative to the phase of the local oscillator. These signal nulls have traditionally-been overcome by using a second detector or mixer that is at a 90 degree phase shift from the first local oscillator. The output of the two mixers are usually combined in an image-reject configuration, or alternatively, by processing the signals in the digital domain. However, both solutions have proven to be undesirable.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3 is a more detailed functional block diagram of an embodiment of a digital portion of the receiver;

FIG. 4 is a more detailed functional block diagram of another embodiment of a digital portion of the receiver;

FIG. 5 is an exemplary plot of the output from the three mixers;

FIG. 6 is an exemplary timing diagram and plot illustrating the timing of relevant signals.

DETAILED DESCRIPTION

Figure 1:
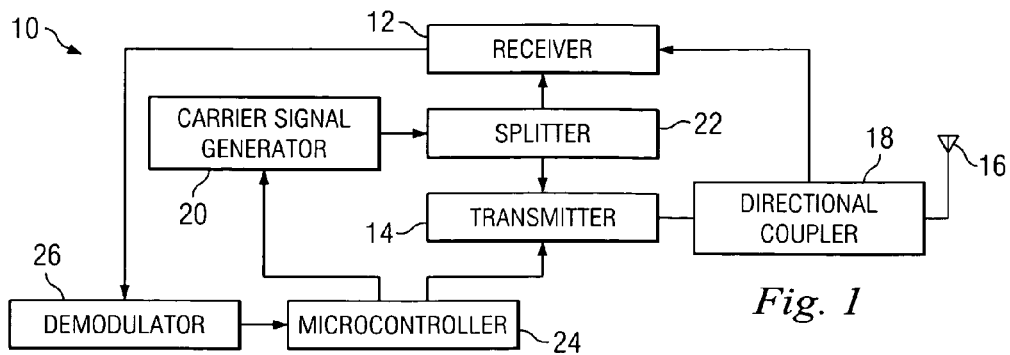
FIG. 1 is a simplified schematic diagram of an embodiment of an RFID transceiver.

FIG. 1 is a simplified schematic diagram of an embodiment of an RFID transceiver 10. Transceiver 10 comprises a receiver 12 that uses three mixers or multipliers, as described in more detail below. Transceiver 10 also comprises a transmitter 14 coupled to an antenna 16 via a directional coupler or circulator 18. A carrier signal generator 20 is coupled to both receiver 12 and transmitter 14 via a signal splitter 22. Alternately, receiver 12 and transmitter 14 may each have its own antennas and directional coupler 18 would not be necessary in that embodiment. A microprocessor or microcontroller 24 is coupled to transmitter 14 and carrier signal generator 20. A demodulator 26 such as an amplitude shift keying (ASK) demodulator is coupled to receiver 12 and microprocessor 24. An optional subcarrier demodulator may be placed between the ASK demodulator and the microprocessor, in the case where the used protocol supports subcarrier modulation in the transponder response signal In operation, carrier signal generator 20 generates a radio frequency carrier signal that is combined with an information signal generated by the microcontroller 24. In particular, the transmission signal output from transmitter 14 includes the carrier signal modulated by the information signal. The transmission signal is radiated by antenna 16 to a transponder or RFID tag (not shown) located in proximity of transceiver 10. The RFID tag may be stationary or moving relative to the transceiver 10. The signal radiated back from the RFID tag in response to the transmitted signal is captured by antenna 16 and delivered to receiver 12. Receiver 12, having three mixers, is operable to split the received signal into three paths, each path feeding into a mixer. Each mixer receives a LO signal that is spaced 120 degrees in phase where the first mixer starts with phase 0, the second one with 120 degrees and the third one with 240 degrees compared to the first one, for example. The method also will work with phase shifts of respectively 60 degrees and 120 degrees. The resultant three baseband signals will each be ASK demodulated and combined in the digital domain, where the signal may be further processed for subcarrier demodulation 26 and the data extracted by microcontroller 24. Details of receiver 12 and operations thereof are described below with reference to FIGS. 2-7 below.

Figure 2:
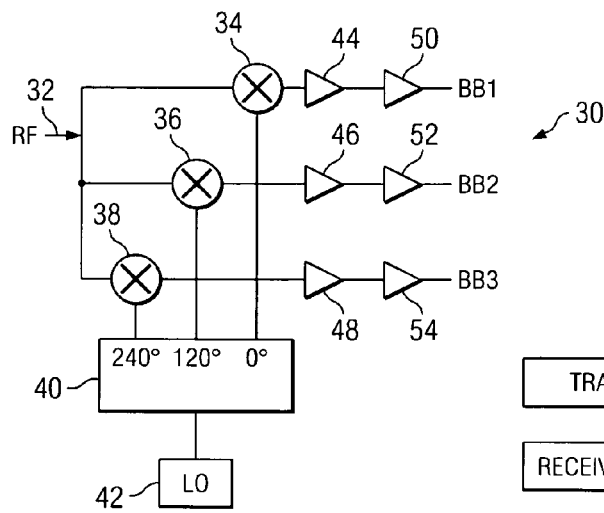
FIG. 2 is a more detailed circuit diagram of an embodiment of an analog portion of the receiver.

FIG. 2 is a more detailed circuit diagram of an embodiment of an analog portion 30 of receiver 12. The analog portion of receiver 12 receives an RF signal 32 as input. RF signal 32 is a backscattered signal generated by the RFID tag in response to a query signal transmitted by the transmitter portion of transceiver 10. The received RF signal is delivered to three mixers 34-38, which respectively multiplies RF signal 32 with three signal phase-shifted signals of the carrier signal generated by components such as a hybrid (or phase shifter) 40 and a local oscillator (LO) 42. Local oscillator 42 may be a voltage-controlled oscillator or another suitable component. Mixer 34 receives and mixes the received RF signal and the local carrier signal with no phase-shift; mixer 36 receives and mixes the received RF signal and the local carrier signal with a 120 degree phase-shift; and mixer 38 receives and mixes the received RF signal and the local carrier signal with a 240 degree phase-shift. Alternatively, the phase shift of the local RF carrier signal used in mixers 34-38 may be 0 degree, 60 degrees, and 120 degrees, for example. The phase shift may be set so that the phase difference between any two of the three local oscillator signals have a minimum difference from 0° and from 180°. The phase-shift angles are selected so that regardless of the phase relationship between the received RF signal and the local carrier signal (which is unknown) that at least two of the three mixers will generate an output signal that has a non-zero amplitude. Referring to FIG. 5, an exemplary plot of the amplitude of the output from the three mixers is shown for any possible phase condition of the received signal.

FIG. 5 illustrates how the phase of the three mixer output do not vary with the phase difference between the local oscillator signal and the received RF signal, but the amplitude of each of the three mixer output signals does depend on the phase difference between the local oscillator signal and the received RF signal. If the phase difference between the received RF signal and the local carrier signal is $\Phi$, then the first mixer output signal amplitude is proportional to cosine $\Phi$, the second mixer output signal amplitude is proportion to cosine $(\Phi+120°)$, and the third mixer output signal amplitude is proportional to cosine $(\Phi+240°)$. The dotted vertical line indicates a point where one of the three mixer output signals has a zero amplitude (or null) and the other two signals have an amplitude equal to one-half times the square root of three ($\frac{1}{2}*\sqrt{3}$) times the maximum amplitude. The phase shift of the signals is either 0° or a 180°.

Returning to FIG. 2, each of the three mixer output signals is amplified by amplifiers 44-48, respectively. The output of the amplifiers are coupled to data slicers 50-54. Data slicers compare the amplified mixer outputs to a predetermined analog level and provides a digital logic output indicative of whether the input is greater than or less than the analog level. If the mixer output is greater than the analog level, then the output of the data slicer is a logic one; if the mixer output is less than the analog level, then the output of the data slicer is a logic zero. The output from data slicers 50-54 are baseband signals, BB1, BB2, and BB3, respectively. The BB1, BB2, and BB3 baseband signals are digital level signals that have no phase shift except for either a 0° or a 180° phase shift, and at least two of them are valid non-null signals. The three phase shift values are not required to be very accurate as even a substantial deviation will still guarantee the presence of at least two valid signals for any phase difference between the received RF signal and the local oscillator signal.

Note that the received RF signal from the RFID tag may be processed by filters (bandpass, low-pass, and/or high-pass filters), limiters, amplifiers and other suitable components to remove unwanted noise, strengthen and otherwise condition the signal. These components are not specifically shown in FIG. 2 in order to better focus attention on the key portions of the circuit.

FIG. 3 is a more detailed functional block diagram of an embodiment of a digital portion 60 of receiver 12. Digital portion 60 is operable to reconstruct a demodulated signal based on transitions observed in the BB1, BB2, and BB3 baseband signals. More specifically, a determination is made as to whether the reconstructed signal needs to have a transition by determining if at least two of the three signals have a substantially simultaneous transition. Transitions are considered to be substantially simultaneous if they occur within a predefined time window within which to compare the signals. The time window is set to be smaller than the shortest interval between transitions in valid data, and larger than the maximum difference in delay between each pair of signals.

In digital portion 60, the baseband signals BB1, BB2, and BB3 are provided to data or D flip-flops 62-66 clocked by a clock signal generated by a clock circuit 68. The output from data flip-flops 62-66 are stable clock-synchronized data, which are provided to delay lines 70-74, respectively. The delay lines determine the size of the comparison time window to observe substantial simultaneous signal transitions. The delay lines may be implemented as known in the art such as using serially-coupled inverters, for example. The delayed and non-delayed clock-synchronized BB1, BB2, and BB3 signals are provided to exclusive-OR gates 80-84, respectively. The output of exclusive-OR gates 80-84 are provided to a majority decision logic 86. The output of majority decision logic 86 is coupled to the input of a transition or T flip-flop 88. Majority decision logic 86 is operable to generate a high output if at least two of the three baseband signals (BB1, BB2, and BB3) have a transition and a low output if only one or none of the three signals has a transition. T flip-flop 88 is operable to reconstruct the demodulated signal by creating a transition in its output from high to low or from low to high if the signal at its T input is high.

If data transition appear substantially simultaneously in two or all three signals within the time window defined by delay lines 70-74, digital portion 60 is operable to correctly reconstruct the data transitions in the received RF signal. However, there are some situations, though unlikely, where a difference in delay between two of the signals carrying a valid data transition causes the transition in one of those signals to be in different comparison time windows. In these situations, digital portion 60 would not correctly reconstruct the data transitions. A second embodiment of digital portion 60 shown in FIG. 4 and described below is operable to resolve this problem.

FIG. 4 is a more detailed functional block diagram of another embodiment of a digital portion 90 of the receiver 12. Digital portion 90 comprises data flip-flops 92-96 receiving the BB1, BB2, and BB3 signals, respectively, from analog portion 30 of the receiver shown in FIG. 2, and provide clock-synchronized signals. The clocked BB1, BB2, and BB3 signals are provided to delay lines having delay components 100-105. Each delay line spans two clock cycles of the clock signal generated by clock circuit 110. Therefore, the comparison time window is now twice the clock cycle time. This results in a data transition determination every clock cycle with successive windows overlapping. Therefore, a delay difference between data transitions in two signals is always detected regardless how they are aligned with the sample times as long as the delay difference is smaller than the comparison time window.

The delayed and non-delayed baseband signals are provided to exclusive-OR gates 112-116, and the output of which are coupled to the input of a majority decision logic block 118. The output of majority decision logic 118 is coupled to a state machine 120. State machine logic 120 avoids the error of generating more than one transition detections as the result of one transition in the received RF signal due to the overlapping comparison time windows. State machine logic 120 is operable to pass on a data transition when it is detected and then ignore the transition detection result for the next two clock cycles. It is preferable to set the clock cycle time to be less than one-third of the minimum time between transitions in a valid signal. The output of state machine 120 is coupled to a T flip-flop 122. The output of the T flip-flop is the reconstructed RFID tag data signal.

The reconstructed signal generated by T flip-flop 122 is the demodulated digital level signal with a constant phase shift regardless of the location or movement of the RFID tag. Since it is unknown what the polarity setting of the T flip-flop is when there is no valid baseband signal present, the polarity of the signal during a datagram transmission is not known. Further data encoding and/or datagram formatting allows for a polarity insensitive decoding. Examples of data encoding includes FM0, FM1, NRZ (non-return to zero), NRZI (non-return to zero inverted) encoding formats; an example of a sub-carrier modulation is frequency-shift keying (FSK) modulation; and an example of datagram formatting uses particular fixed and known run-in patterns. Although the polarity of data in a datagram as output by this circuit is unknown, the polarity does not change within a datagram.

In implementation, the functional blocks of digital portions 60 or 90 of the receiver may be combined into one logic component and may be implemented by a programmable logic device or field programmable gate array, for example. Alternatively, the functions carried out by the digital portion of the receiver may be implemented in computer software and executed in microcontroller 24 (FIG. 1) or another processor as long as the processing speed is sufficiently fast to reconstruct a valid signal given the data rate, data encoding and sub-carrier modulation.

FIG. 6 is an exemplary timing diagram and plot illustrating the timing of the received RF signal from the RFID tag, signals BB1, BB2, and BB3, and the reconstructed signal. The dashed lines in the timing diagram represent the rising or falling edge of the clock signal, and successive comparison time windows overlap, as labeled by $W_1$, $W_2$, $W_3$, ... $W_8$. For example, the first half of time window $W_2$ overlaps the second half of time window $W_1$, and the first half of time window $W_3$ overlaps the second half of time window $W_2$, and so on. In time window $W_1$, the valid data transition 130 in baseband signal BB1 and valid data transition 131 in baseband signal BB3 produce a data transition 132 in the reconstructed signal at the output of the T flip-flop. In comparison time window $W_5$, valid data transition 134 in baseband signal BB1 and valid transition 135 in baseband BB3 produce a data transition 136 in the reconstructed signal. In comparison time window $W_7$, valid transition 138 in baseband signal BB1 occurs in the first half of the time window, and valid transition 139 in baseband signal BB3 occurs in the second half of the time window. Digital portion 60 of the receiver, as shown in FIG. 3, would not have properly detected these transitions as occurring in the same time window and therefore would not have generated the proper data transition in the reconstructed signal. Digital portion 90 of the receiver, on the other hand, would have detected data transitions 138 and 139 as occurring substantially simultaneously in the same time window and would generate a proper data transition 140 in the reconstructed signal.

Figure 7:
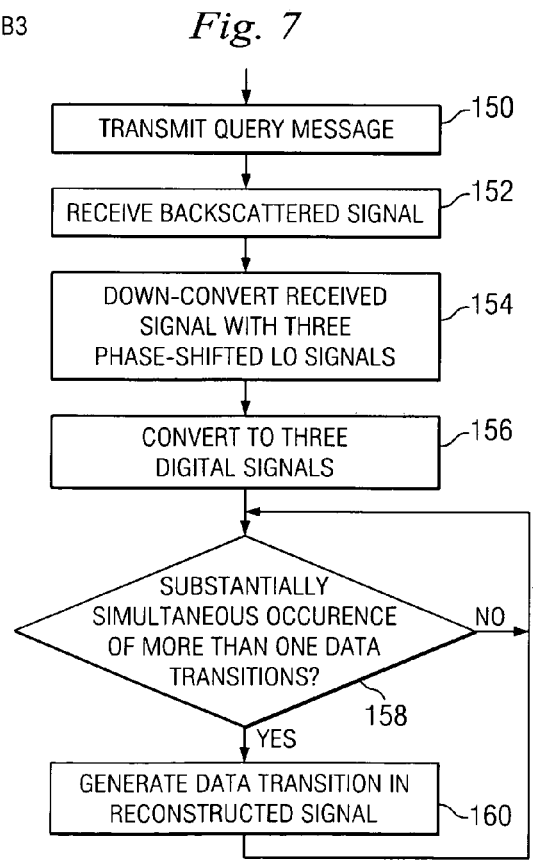
FIG. 7 is a simplified flowchart of an embodiment of a method for an RFID transceiver.

FIG. 7 is a simplified flowchart of an embodiment of a method for an RFID transceiver that communicates with an RFID tag or transponder. The RFID tag is typically located at an unknown distance to the Transceiver and may be traveling at an unknown rate relative to the RFID transceiver. Referring also to FIG. 1, at the beginning of a polling cycle in block 150, a query message is processed by transmitter 14 and transmitted by antenna 16. The query message is the carrier signal or local oscillator signal modulated according to the information signal from microcontroller 24. The carrier signal is generated in carrier signal generator 20. In response to the query message, the RFID tag transmits a reply message and antenna 16 captures the backscattered reply message in block 152. The reply message is directed to receiver 12 for processing. The received signal is properly filtered by one or more filters (not shown) to removed unwanted signals and is down-converted to baseband by using three mixers 34-38 (FIG. 2) in block 154. Mixer 34 multiplies the carrier signal generated in carrier signal generator 20 and the received signal; mixer 36 multiplies a 60° phase-shifted carrier signal and the received signal; and mixer 38 multiplies a 120° phase-shifted carrier signal and the received signal. The signals from the three mixers are converted to digital signals in block 156. The resultant three baseband signals BB1, BB2, and BB3 may be further processed by filtering and amplification. A determination is then made as to whether more than one valid data transition in the baseband signals occur substantially simultaneously in block 158 (FIGS. 3 and 4). If valid data transitions occur in more than one of the baseband signals within a predetermined time window determined by the delay lines in the digital portion of the receiver, then a data transition is generated in the reconstructed signal in block 160. Otherwise, the process continues to monitor the baseband signals for the same determination in decision block 158 until the reply message has been processed. It may be seen that one embodiment (FIG. 4) uses overlapping successive time windows for this determination, and another embodiment (FIG. 3) uses non-overlapping time windows.

The system and method described herein is more robust and yet low-cost solution in particular for applications where fast-moving RFID tags and weak tag signals are expected. The system and method described herein does not employ unreliable analog phase-shifting of the baseband signal typically used in image-reject mixer configuration. Unreliable analog decision circuits are also not needed to determine which signal from the mixers are valid.

The system and method described herein, although described in the context of an RFID, are applicable to non-RFID applications.

Although embodiments of the present disclosure have been described in detail, those skilled in the art should understand that various changes, substitutions and alterations may be made without departing from the spirit and scope of the present disclosure. For example, a bandpass filter may be implemented by a low-pass filter and a high-pass filter. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. An RFID circuit, comprising:
an RF carrier signal source;
a hybrid coupled to the RF carrier signal source operable to generate first, second and third phase-shifted RF carrier signals;
first, second, and third mixers coupled to the hybrid each operable to multiply one of the first, second and third respective carrier signals and a backscattered modulated carrier signal and generate first, second and third baseband signals, respectively;
first, second, and third delay lines respectively coupled to the first, second, and third mixers and operable to generate first, second and third delayed baseband signals; and
logic coupled to the first, second, and third mixers and the first, second, and third delay lines and operable to detect substantially simultaneous data transitions in at least two of the first, second, and third baseband signals, and generating a reconstucted signal having a data transition in response thereto.

2. The RFID circuit of claim 1, wherein the logic comprises:
first, second, and third data flip-flops coupled to the first, second, and third mixers and operable to generate clock-synchronized first, second and third baseband signals, respectively;
first, second, and third exclusive-OR gates coupled to the first, second, and third delay lines respectively to the first, second, and third data flip-flops;
a majority logic module coupled to outputs of the first, second, and third exclusive-OR gates and operable to detect a data transition in at least two of the first, second, and third baseband signals during a predetermined time window; and
a transition flip-flop coupled to the majority logic module and operable to generate a data transition in the reconstructed signal in response to a transition detection output from the majority logic module.

3. The RFID circuit of claim 1, wherein the hybrid is operable to generate 0 degree, 120 degree, and 240 degree phase-shifted RF carrier signals.

4. The RFID circuit of claim 1, wherein the hybrid is operable to generate 0 degree, 60 degree, and 120 degree phase-shifted RF carrier signals.

5. The RFID circuit of claim 1, wherein the hybrid is operable to generate three phase-shifted RF carrier signals where the phase difference between any two have a minimum difference of 0 to 180 degrees.

6. The RFID circuit of claim 1, further comprising first, second, and third amplifiers respectively coupled to the first, second, and third mixers and operable to amplify the first, second, and third baseband signals.

7. The RFID circuit of claim 1, further comprising first, second, and third data slicers respectively coupled to the first, second, and third mixers and operable to generate first, second, and third digital baseband signals corresponding to the first, second, and third baseband signals.

8. The RFID circuit of claim 1, wherein the first, second, and third delay lines are operable to define time windows during which substantially simultaneous data transitions in the first, second, and third baseband signals may be detected.

9. The RFID circuit of claim 1, wherein the first, second, and third delay lines are operable to define successive overlapping time windows during which substantially simultaneous data transitions in the first, second, and third baseband signals may be detected.

10. The RFID circuit of claim 1, further comprising:
an information signal source;
a transmitter receiving the RF carrier signal and the information signal and operable to modulate the RF carrier signal according to the information signal; and
an antenna transmitting the modulated RF carrier signal.

11. The RFID circuit of claim 10, further comprising a splitter coupled to the RF carrier signal source and operable to pass the RF carrier signal to the hybrid and the transmitter.

12. A method comprising:
generating a carrier signal;
receiving a modulated carrier signal;
multiplying the received modulated carrier signal and first, second, and third phase-shifted carrier signals and generating first, second, and third baseband signals, respectively;
delaying each of the first, second, and third baseband signals; and
detecting substantially simultaneous data transitions in at least two of the first, second, and third baseband signals, and generating a reconstructed signal having a data transition in response thereto.

13. The method of claim 12, wherein detecting substantially simultaneous data transitions comprises defining a time window during which data transitions are detected.

14. The method of claim 12, wherein detecting substantially simultaneous data transitions comprises defining successive overlapping time windows where substantially simultaneous data transitions occur in successive time windows.

15. The method of claim 12, wherein detecting substantially simultaneous data transition comprises:
generating an exclusive-OR output of each of the delayed first, second, and third baseband signals and respective first, second, and third baseband signals; and
detecting whether at least two of the exclusive-OR outputs are high.

16. The method of claim 12, further comprising generating only one data transition in the reconstructed signal in response to detecting substantially simultaneous data transitions in at least two of the first, second, and third baseband signals.

17. The method of claim 12, further comprising generating first, second, and third digital baseband signals corresponding to first, second, and third baseband signals.

18. The method of claim 12, further comprising generating 0 degree, 120 degree, and 240 degree phase-shifted RF carrier signals.

19. The method of claim 12, further comprising generating 0 degree, 60 degree, and 120 degree phase-shifted RF carrier signals.

20. The method of claim 12, further comprising removing unwanted signals from the received modulated carrier signal.

21. An RFID device comprising:
means for generating a carrier signal;
means for receiving a modulated carrier signal;
means for multiplying the received modulated carrier signal and first, second, and third phase-shifted carrier signals and generating first, second, and third baseband signals, respectively;
means for generating clock-synchronized first, second and third baseband signals, respectively; and
means for detecting substantially simultaneous data transitions in at least two of the first, second, and third baseband signals, and generating a reconstructed signal having a data transition in response thereto.

22. The RFID device of claim 21, wherein the means for detecting comprises:
first, second, and third exclusive-OR gates coupled to the first, second, and third delay lines respectively to the first, second, and third data flip-flops;
logic means, coupled to outputs of the first, second, and third exclusive-OR gates, for detecting a data transition in at least two of the first, second, and third baseband signals during a predetermined time window; and
means for generating a data transition in the reconstructed signal in response to a transition detection output from the logic means.

23. The RFID device of claim 21, further comprising means for generating 0 degree, 120 degree, and 240 degree phase-shifted RF carrier signals.

24. The RFID device of claim 21, further comprising means for generating 0 degree, 60 degree, and 120 degree phase-shifted RF carrier signals.

25. The RFID device of claim 21, further comprising first, second, and third data slicers respectively coupled to the means for multiplying and operable to generate first, second, and third digital baseband signals corresponding to the first, second, and third baseband signals.

26. The RFID device of claim 21, further comprising first, second, and third delay lines operable to define time windows during which substantially simultaneous data transitions in the first, second, and third baseband signals may be detected.

27. The RFID device of claim 21, further comprising first, second, and third delay lines operable to define successive overlapping time windows during which substantially simultaneous data transitions in the first, second, and third baseband signals may be detected.

28. The RFID device of claim 21, further comprising:

means for generating an information signal;

means for receiving the RF carrier signal and the information signal and modulating the RF carrier signal according to the information signal; and means for transmitting the modulated RF carrier signal.

* * * * *

UNITED STATES PATENT AND TRADEMARK OFFICE
CERTIFICATE OF CORRECTION

PATENT NO.       : 7,366,465 B2                                       Page 1 of 1
APPLICATION NO.  : 10/992958
DATED            : April 29, 2008
INVENTOR(S)      : Bernard Barink and Loek J. d'Hont It is certified that error appears in the above-identified patent and that said Letters Patent is hereby corrected as shown below:

In column 6, claim 1, line 66 – replace "reconstucted" with -- reconstructed --

Signed and Sealed this

Fifteenth Day of July, 2008

JON W. DUDAS
*Director of the United States Patent and Trademark Office*